(12) United States Patent
Kohda (10) Patent No.: US 7,070,164 B2
(45) Date of Patent: Jul. 4, 2006

(54) COUPLING MEMBER OF A PIPE COUPLING

(75) Inventor: Toru Kohda, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 43 days.

(21) Appl. No.: 10/971,963

(22) Filed: Oct. 22, 2004

(65) Prior Publication Data

US 2005/0087241 A1 Apr. 28, 2005

(30) Foreign Application Priority Data

Oct. 22, 2003 (JP) ............................. 2003-361384

(51) Int. Cl.
*F16L 37/28* (2006.01)
(52) U.S. Cl. ............................. 251/149.2; 137/614.03; 137/614.04; 137/614.02
(58) Field of Classification Search ........... 137/614.03, 137/614.04, 614.05, 614.02; 251/149.2
See application file for complete search history.

(56) References Cited

U.S. PATENT DOCUMENTS

| | | | | |
|---|---|---|---|---|
| 3,279,497 A | * | 10/1966 | Norton et al. | ......... 137/614.03 |
| 4,181,149 A | * | 1/1980 | Cox | ....................... 137/614.02 |
| 4,473,211 A | | 9/1984 | Fremy | |
| 6,598,620 B1 | * | 7/2003 | Fremy | .................... 137/614.03 |
| 2005/0087239 A1 | | 4/2005 | Kohda | |
| 2005/0087240 A1 | | 4/2005 | Kohda | |

FOREIGN PATENT DOCUMENTS

| JP | S58-160692 A | 9/1983 |
|---|---|---|
| JP | 2004-211739 A | 7/2004 |

\* cited by examiner

*Primary Examiner*—Kevin Lee
(74) *Attorney, Agent, or Firm*—Brinks Hofer Gilson & Lione

(57) ABSTRACT

A coupling member comprises a spherical rotatable valve member installed in a fluid passage thereof, in which the fluid passage is maintained open when a through hole of the valve member is aligned with the fluid passage, while the fluid passage is maintained closed when the through hole of the valve member not aligned with the fluid passage. An annular sealing convex portion is arranged on the outer surface of the valve member, which has larger radii relative to a pivotal axis A than the outer surface, so that the sealing convex portion is fully engaged with an end-opening peripheral edge of the fluid passage only when the valve member is placed in the closing rotational position.

10 Claims, 10 Drawing Sheets

COUPLING MEMBER OF A PIPE COUPLING

This application claims priority under 35 U.S.C. § 119 to Japanese Patent Application No. 2003-361381 filed Oct. 22, 2003, the entire content of which is hereby incorporated by reference. This application is also related to U.S. patent application Ser. Nos. 10/971,368 and 10/971,955, both naming Toru Kohda as the sole inventor, filed on Oct. 22, 2004, the entire specifications of which are incorporated herein by reference for all purposes as if fully set forth herein.

BACKGROUND OF THE INVENTION

The present invention relates to a coupling member of a pipe coupling.

There is known a coupling member of a pipe coupling which includes a female coupling member and a male coupling member. Such a pipe coupling may include a valve disposed in the inside thereof, the valve e functioning to open and close a fluid passage in the coupling member. An example of one such type of valve is one that is configured to comprise a rotatable valve member which defines a spherical shape as a whole, and rotatable about a predetermined pivotal axis, wherein when the valve member is in a first rotational position about the pivotal axis, a spherical outer surface of the rotatable valve member is sealingly engaged with a peripheral end-opening edge of a fluid passage portion in the coupling member to close the fluid passage; while when the valve member is in a second rotational position, a through hole formed through the rotatable valve member is aligned with the fluid passage to thereby open the fluid passage. (See, for example, Japanese Patent Laid-open Publication No. Sho 58-160692.)

SUMMARY OF THE INVENTION

A coupling member having the configuration described above, whereby a spherical outer surface of the rotatable valve member is maintained in contact engagement with an end-opening peripheral edge of the fluid passage, gives rise to a problem in that a considerable frictional resistance is generated upon rotational movement of the valve member, which inhibits proper connection and disconnection of the coupling members.

It is therefore an object of the present invention to provide a coupling member that is free from such a problem, and that ensures smooth and reliable connection and disconnection of respective coupling members.

To accomplish the object outlined above, the present invention provides a coupling member of a pipe coupling comprising:

a tubular body having a though hole; and,
a valve disposed in the through hole; wherein
the valve comprises:
a valve holder movable in a direction of an axis of the through hole between a closing position and an opening position; and
a rotatable valve member supported by the valve holder;
the valve holder comprises:
a first tubular portion, a rotatable valve member support portion, and a second tubular portion which are arranged in that order along the axis of the through hole;
the first and second tubular portions have first and second axial through holes, respectively,
the rotatable valve member support portion supports the rotatable valve member such that the rotatable valve member is rotatable about a pivotal axis extending normal to the axis of the through hole so that, when the valve holder is moved between the opening position and the closing position, the rotatable valve member is rotated about the pivotal axis between an opening rotational position and a closing rotational position, respectively;

the rotatable valve member has a third through hole extending normal to the pivotal axis which is aligned with the first and second through holes when positioned at the opening rotatable position, thereby allowing a fluid to flow through the coupling member;

the rotatable valve member has an outer surface which is formed with an annular sealing portion adapted to be sealingly engaged with an annular portion on an outer surface of the first tubular portion which surrounds an end-opening of the first through hole facing the rotatable valve member support portion when the rotatable valve member is positioned at the closing rotational position, whereby the outer surface of the rotatable valve member sealingly blocks the end-opening of the first through hole to prevent a fluid from flowing through the coupling member; and, the outer surface of the rotatable valve member has a portion which passes through the annular portion on the outer surface of the first tubular portion when the rotatable valve member rotates between the opening rotational position and the closing rotational position, the portion having smaller radii relative to the pivotal axis than the annular sealing portion, so as to reduce a friction force generated between the outer surface of the rotatable valve member and the annular portion on the outer surface of the first tubular member.

In this coupling member, the outer surface of the rotatable valve member is brought into full-surface sealing engagement with the annular portion at the peripheral edge of the fluid passage of the coupling member only when the rotatable valve member is positioned at the closing rotational position, and consequently, the rotatable valve member can be rotated under a smaller force than that required in the conventional art.

In one embodiment of the coupling member of the present invention, the radii of the annular sealing portion are larger relative to the pivotal axis, than a surrounding portion of the annular sealing portion on the outer surface.

In another embodiment of the coupling member of the present invention, the annular sealing portion may be formed to be integral with an exterior surface of the rotatable valve member. Alternatively, it may be formed by fittingly securing an annular sealing member in an annular groove formed on the outer surface of the rotatable valve member.

In still another embodiment of the coupling member of the present invention, the rotatable valve member defines a spherical shape as a whole and have a truncated surface portion 30-4 with respect to the spherical surface; and the valve holder may include a stopper surface portion which is engaged with the truncated surface portion of the rotatable valve member to stop the rotatable valve member in the opening rotational position when the rotatable valve member is positioned in the opening rotational position.

This allows the rotatable valve member to be precisely positioned at the opening rotational position.

Further, in another embodiment of the coupling member of the present invention, the valve holder may further comprise a spring member for applying a rotational moment to the rotatable valve member so as to urge the truncated surface portion of the rotatable valve member against the stopper surface when the rotatable valve member is positioned at the opening rotational position.

By this configuration, the rotatable valve member can be held at the opening rotational position in a precise and reliable manner.

DESCRIPTION OF THE PREFERRED EMBODIMENTS

A coupling member according to the present invention will now be described with reference to the attached drawings.

Figure 1:
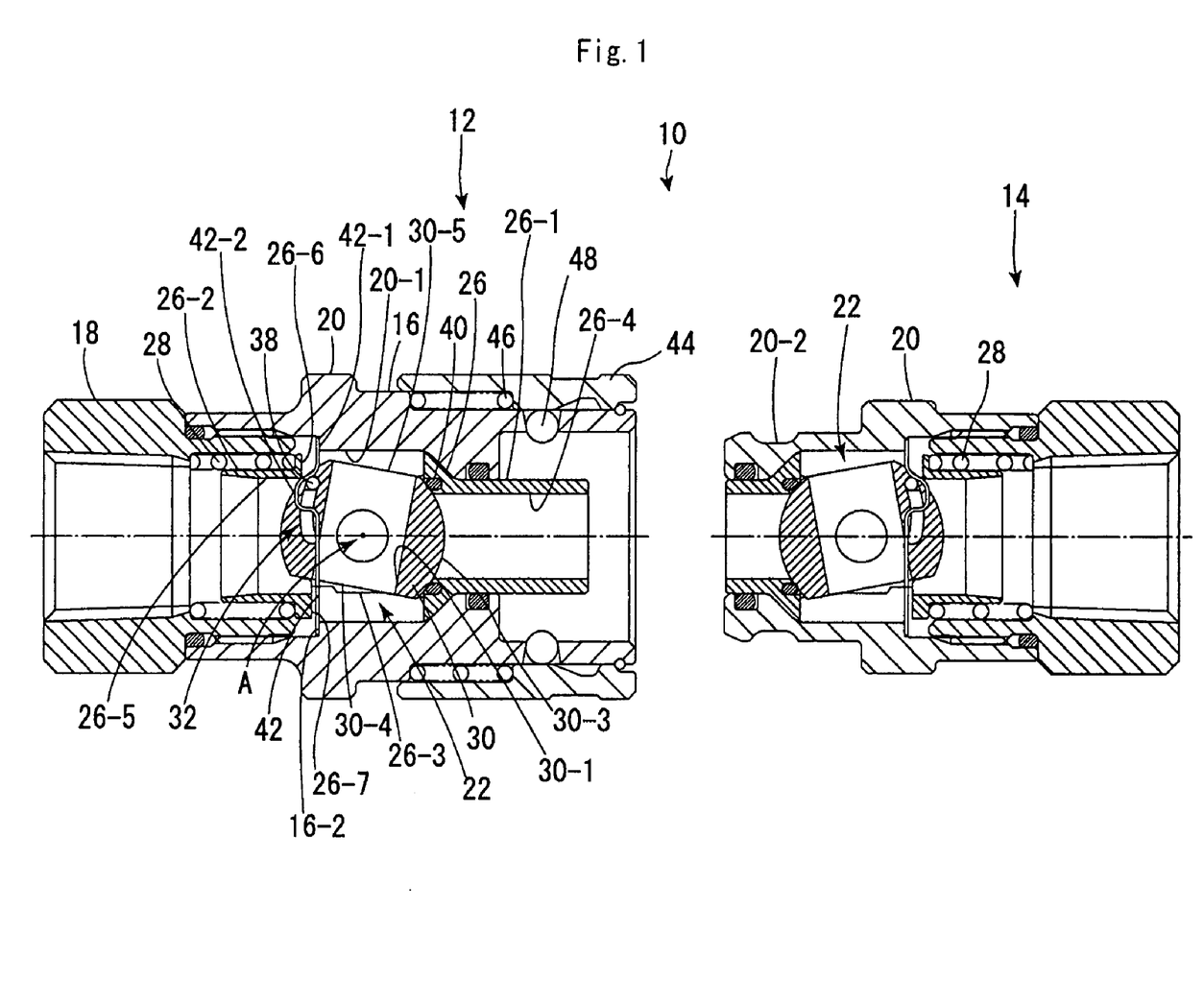
FIG. 1 is a longitudinal sectional view of a pipe coupling comprising a female and a male coupling members to which the present invention is applied, showing a state where the coupling members are disconnected from each other.
Figure 2:
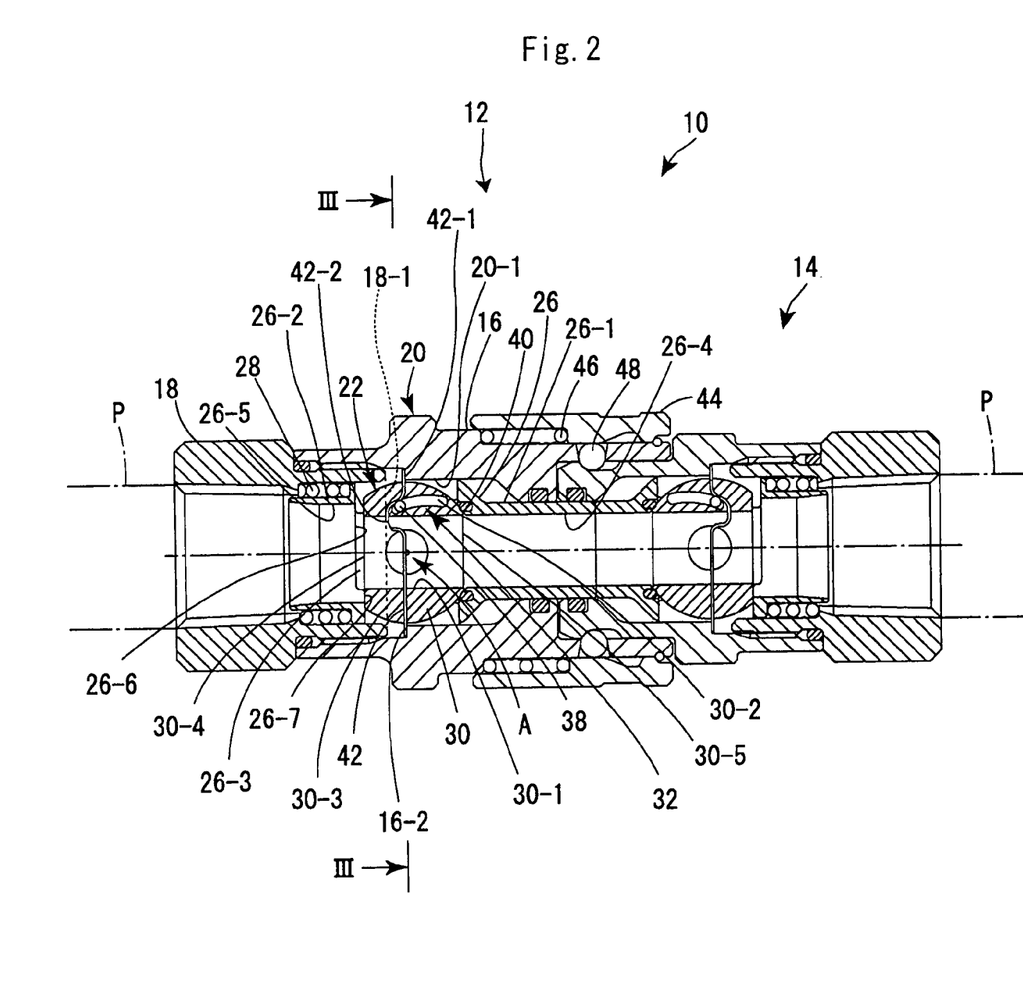
FIG. 2 is a longitudinal sectional view of the same pipe coupling, showing a state wherein the male and the female coupling members are connected with each other.
Figure 3:
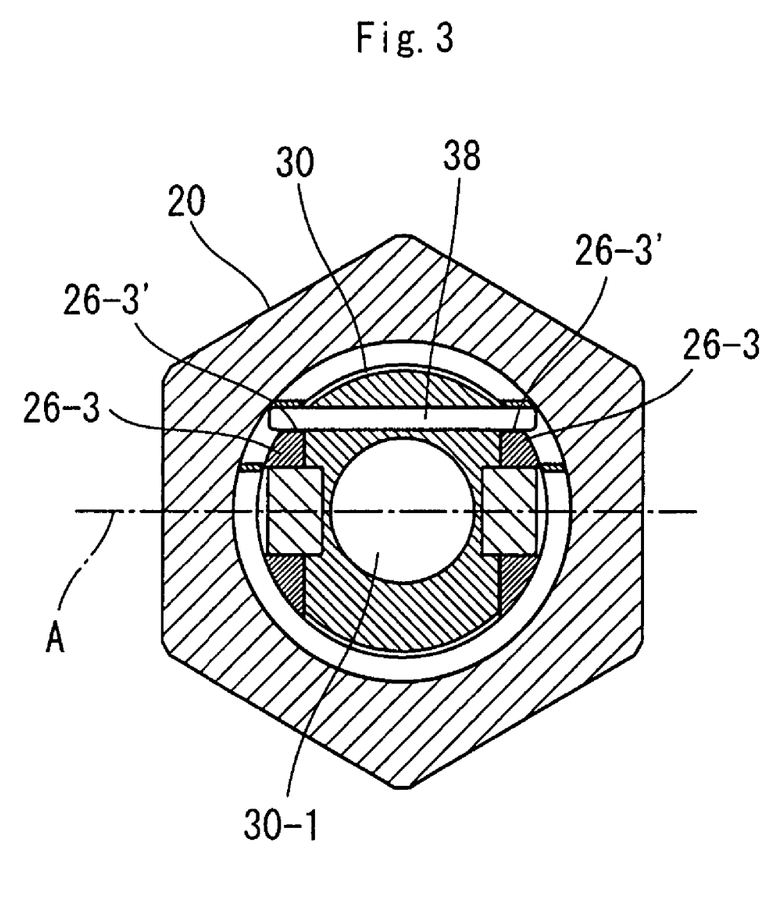
FIG. 3 is a sectional view taken along the line III—III of FIG. 2.
Figure 8:
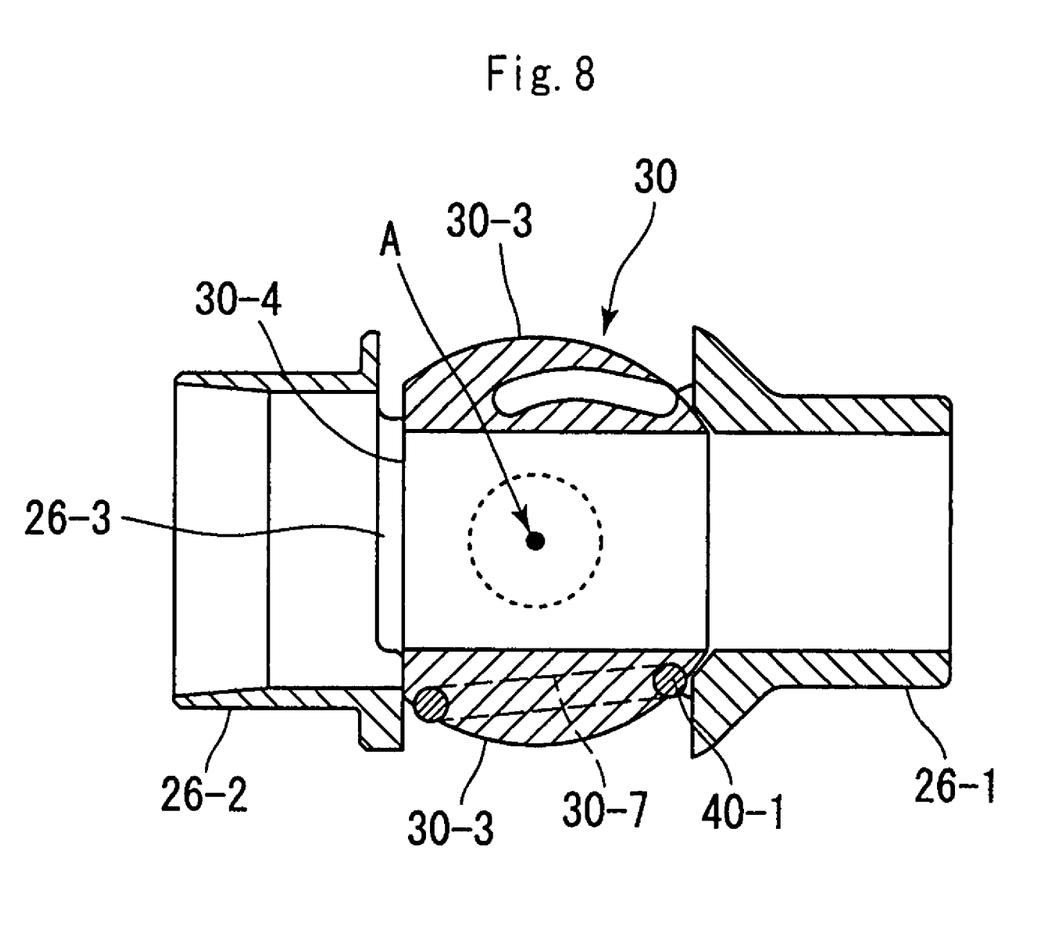
FIG. 8 is a longitudinal sectional view of the valve equipped with a rotatable valve member according to another embodiment, showing a state where the same rotatable valve member is positioned at the opening rotational position.
Figure 9:
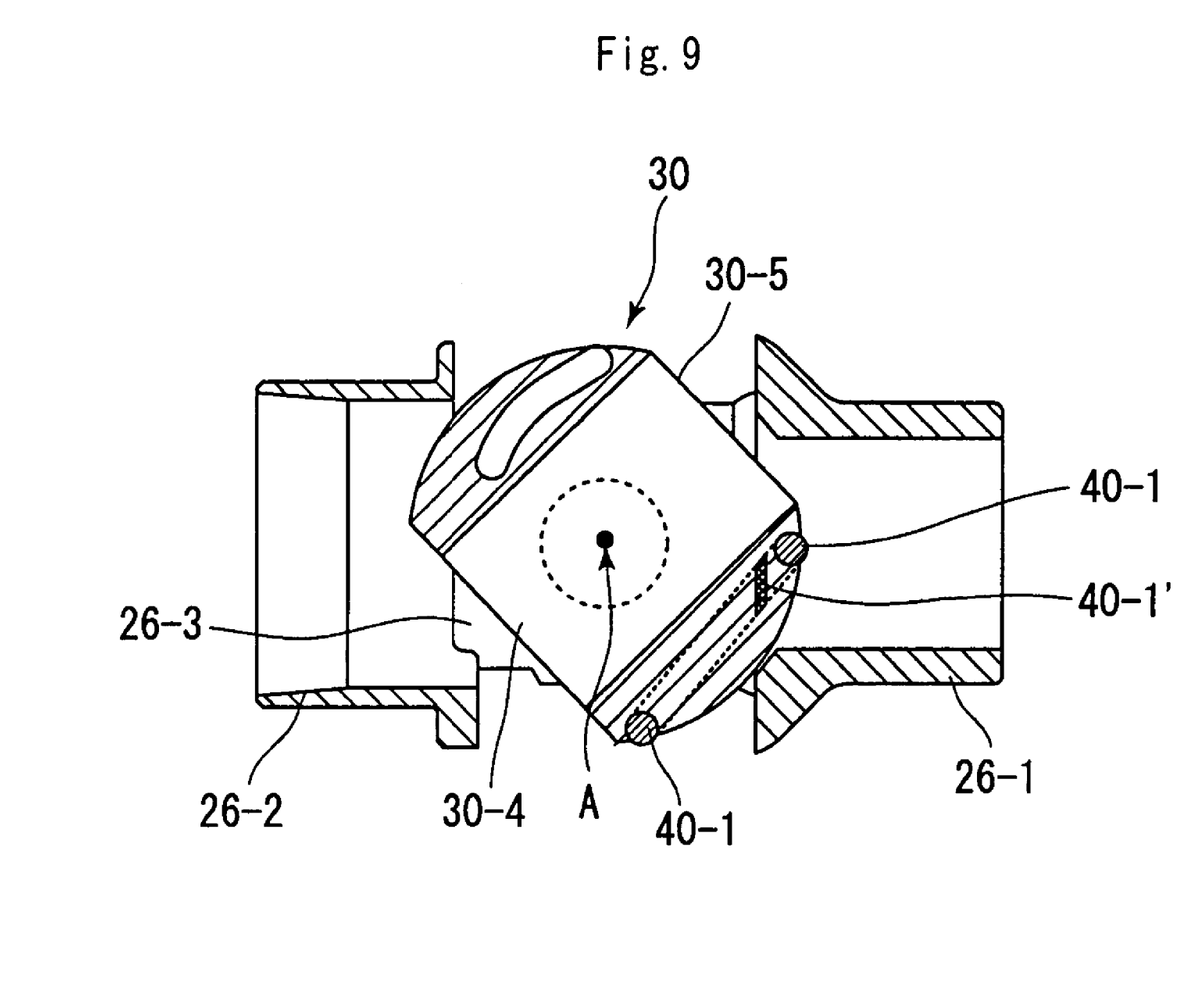
FIG. 9 is a longitudinal sectional view of the valve, showing a state where the same rotatable valve member is in a course of rotational movement from the opening rotational position.
Figure 10:
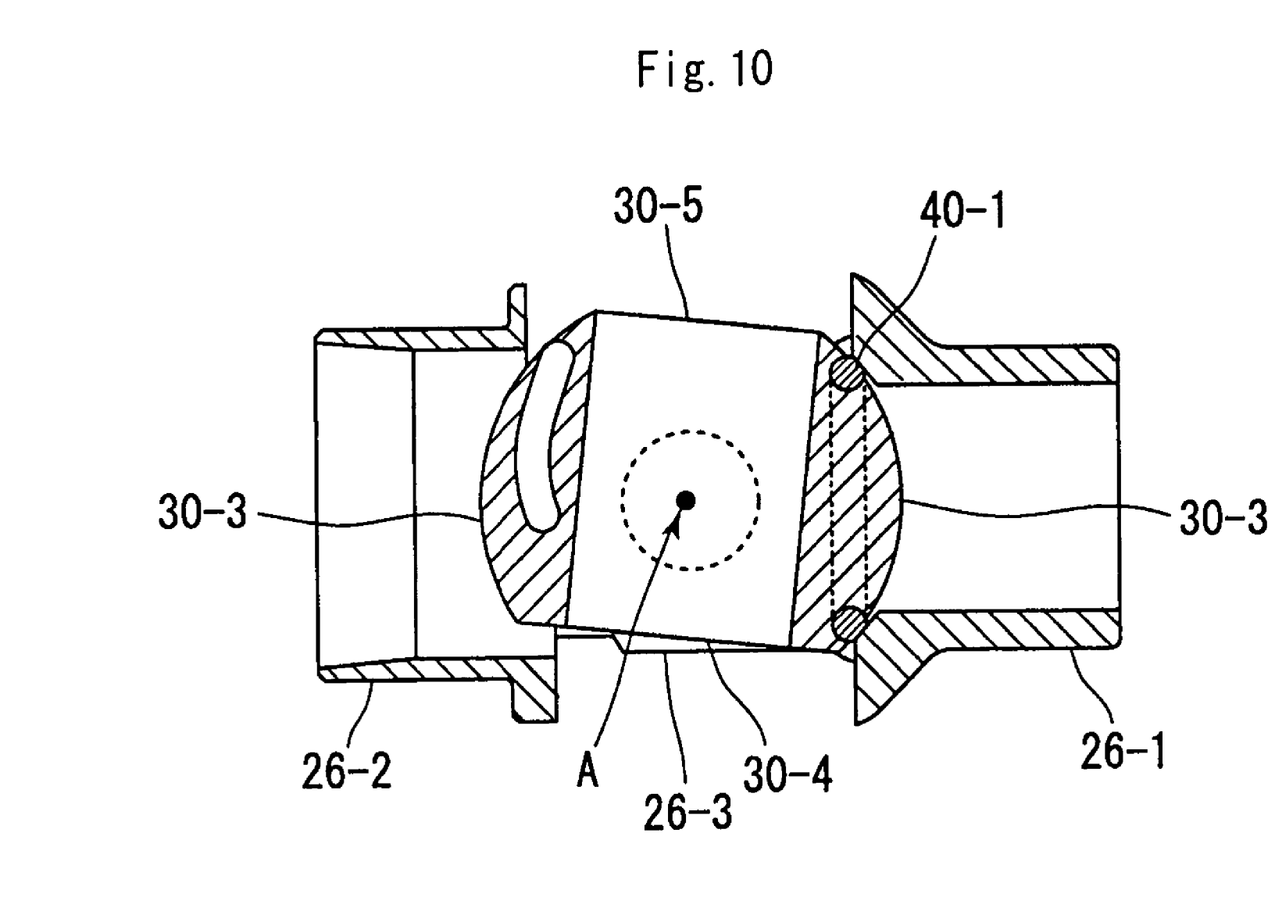
FIG. 10 is a longitudinal sectional view of the valve, showing a state where the same rotatable valve is positioned at the closing rotatable position.

FIGS. 1 to 3 show a pipe coupling 10 comprising a female coupling member 12 and a male coupling member 14, to which the present invention is applied; FIGS. 4 to 7 show an embodiment of a rotatable valve member incorporating the features of the present invention; and FIGS. 8 to 10 show an alternative embodiment of the same rotatable valve member 30, respectively in an enlarged scale.

Referring now to FIGS. 1 to 3, the female coupling member 12 comprises a tubular body 20 including a tubular coupling member body 16 and a tubular adapter 18 connected to a rearward end of the coupling member body and serving to connect the coupling member 12 with a conduit P, and a valve 22 disposed in a through hole 20-1 extending through the tubular body to be movable in a direction of an axis of the through hole.

The valve 22 comprises a valve holder 26 movable in the axial direction of the through hole, a spring member 28 for urging the valve holder towards the forward end of the tubular body 20, and a rotatable valve member 30 supported by the valve holder 26 to be rotatable about a pivotal axis A extending in a direction normal to the axis of the tubular body 20.

The valve holder 26 comprises a forward tubular portion 26-1, a rearward tubular portion 26-2, and a rotatable valve support portion comprising a pair of left and right side walls 26-3, 26-3 (only one of them is illustrated in FIGS. 1 and 2) extending between the forward and the rearward tubular portions for interconnecting them, in which the rotatable valve member 30 is supported by the left and the right side walls 26-3, 26-3 to be rotatable about the pivotal axis A. The rotatable valve member 30 has a through hole 30-1 extending in a direction normal to the pivotal axis.

A cam mechanism 32 is operatively provided between the valve 22 and the tubular body 20 such that as the valve holder 26 moves in the axial direction of the through hole the rotatable valve member 30 is able to rotate about the pivotal axis A. Specifically, the cam mechanism 32 comprises a cam hole 30-2 formed to pass through the rotatable valve member 30 in a direction parallel to the pivotal axis and to define by its cross-sectional surface a desired cam curve extending normal to the pivotal axis, and a straight pin 38 extending through the cam hole 30-2 in the direction of the pivotal axis, in which opposite ends of the pin 38 are loosely fitted within spaces enclosed by upper horizontal surfaces 26-3', 26-3' of the left and the right side walls 26-3, 26-3, a valve urging spring 42 (which will be described later) and an annular shoulder portion 16-2 of the coupling member body 16 facing the rearwards, which will be also described later. When the valve holder 26 is moved in the axial direction of the through hole, the rotatable valve member 30, which is configured to be moved in the axial direction in association with the valve holder 26, is rotated about the pivotal axis A with the side walls of the cam hole 30-2 formed therein sliding on the pin 38. That is, the pin 38 is configured to be loosely fitted at its opposite ends in these spaces so as to be brought into contact with the side wall of the cam hole 30-2, appropriately displaced, and further engaged with the valve member urging spring 42 or the like defining the spaces to thereby provide the rotatable valve member 30 with a rotational moment about the pivotal axis via the side wall of the cam hole 30-2. Since the pin is not fixedly attached but can be appropriately displaced no excessive force is generated between the pin 38 and the side wall of the cam hole 30-2, and accordingly the rotatable valve member 30 is able to rotate smoothly.

In a state as illustrated in FIG. 1, where the female coupling member 12 and the male coupling member 14 have been disconnected and thus separated from each other, the valve 22 is urged by the spring member 28 towards the forward end of the tubular body 20 to be placed in a closing position, and in this closing position, the rotatable valve member 30 is also placed in its closing rotational position, wherein a through hole 30-1 of the rotatable valve member 30 is not aligned with through holes 26-4 and 26-5 of the forward and the rearward tubular portions 26-1 and 26-2 of the valve holder 26, and an outer surface 30-3 defining a spherical surface of the rotatable valve member 30 is sealingly engaged with an O-ring 40 disposed circumferentially around the rearward opening of the forward tubular portion 26-1 so as to block a flow of fluid through the valve 22.

In the condition illustrated in FIG. 2 where the female coupling member 12 and the male coupling member 14 have been interconnected, the valve 22 is placed in an opening position and defines a state where the valve 22 is urged into the tubular body 22 against the force exerted by the spring member 28. In this opening position, the rotatable valve member 30 is also in an opening rotational position, wherein the through hole 30-1 of the rotatable valve member 30 is aligned with the through holes 26-4 and 26-5 of the forward and the rearward tubular portions 26-1 and 26-2 of the valve holder 26 so as to allow the fluid to flow through the valve 22.

As the valve 22 is moved from the closing position, as shown in FIG. 1, into the opening position as shown in FIG. 2, the cam hole 30-2 is slidably engaged with the pin 38, so that the rotatable valve member 30 is subject to a rotational moment in a clockwise direction under a reaction force exerted by the pin, and is thus forced to rotate from the closing rotational position to the opening rotational position. Conversely, as the valve 22 is moved from the opening position, as shown in FIG. 2, to the closing position as shown in FIG. 1, the cam hole 30-2 is slidably engaged with the pin 38, so that the rotatable valve member 30 is subject to a rotational moment in a counterclockwise direction under the reaction force exerted by the pin, and is thus forced to rotate from the opening rotational position to the closing rotational position.

A part (a lower portion in FIG. 1) of a forward end surface 26-6 of the rearward tubular portion 26-2 of the valve holder 26 extends forward and forms a stopper 26-7 for the rotatable valve member 30. The rotatable valve member 30 has truncated surface portions 30-4, 30-5 formed at the positions corresponding to the opposite ends of, and extending normal to the through hole 30-1. In the opening rotational position of the rotatable valve member (FIG. 2) one of the truncated surface portions 30-4 is brought into face-to-face engagement with the stopper 26-7 and is held stationary at that location. In addition, an interior surface of the through hole of the coupling member body 16, which is configured to surround the periphery of the rotatable valve member 30 in its opening rotational position, is provided with an annular shoulder portion 16-2 which faces towards the rearward end of the coupling member body 16. The valve urging spring member 42 has an annular shape so as to surround the periphery of the rotatable valve member 30 and is disposed between the shoulder portion 16-2 and a forward end peripheral edge 18-1 of an adapter 18 so as to be engaged with the pin 38. Specifically, the valve urging spring member 42 is made from a spring sheet, and comprises an annular shoulder abutting portion 42-1 which is brought into abutment against the shoulder portion 16-2, and an adapter abutting portion 42-2, which is bent from the annular portion 42-1 towards the rearward end of the female coupling member 12 so as to abut against the forward end peripheral edge surface 18-1 of the adapter 18, and is held and clamped between the shoulder portion 16-2 and the forward end peripheral edge surface 18-1 of the adapter 18. The adapter abutting portion 42-2 is arranged at each of two locations spaced circumferentially along the annular shoulder abutting portion 42-1 (only one of them is illustrated in FIGS. 1 and 2). The adapter abutting portions 42-2 rise from the annular shoulder abutting portion 42-1 towards the rearward end of the female coupling member 12, together with the shoulder portion 16-2 and the upper horizontal surfaces 26-3' and 26-3' formed in the left and the right side walls 26-3 and 26-3 to define spaces for holding the opposite ends of the pin 38. As the rotatable valve member 30 is rotated towards the opening rotational position, effectively starting from a stage shortly before the truncated surface portion 30-4 of the rotatable valve member 30 is urged against the stopper 26-7, the pin 38 is urged under a gradually increasing force exerted by the side wall of the cam hole 30-2 against the valve member urging spring 42; and in a state where the truncated surface portion 30-4 of the rotatable valve member 30 has been urged against the stopper 26-7, the rotatable valve member 30 is held stable so as not to move from the stopper, even in a case that there occurs a significant variation in fluid pressure. Thereby, the through hole of the rotatable valve member 30 can be reliably and securely maintained open.

Figure 4:
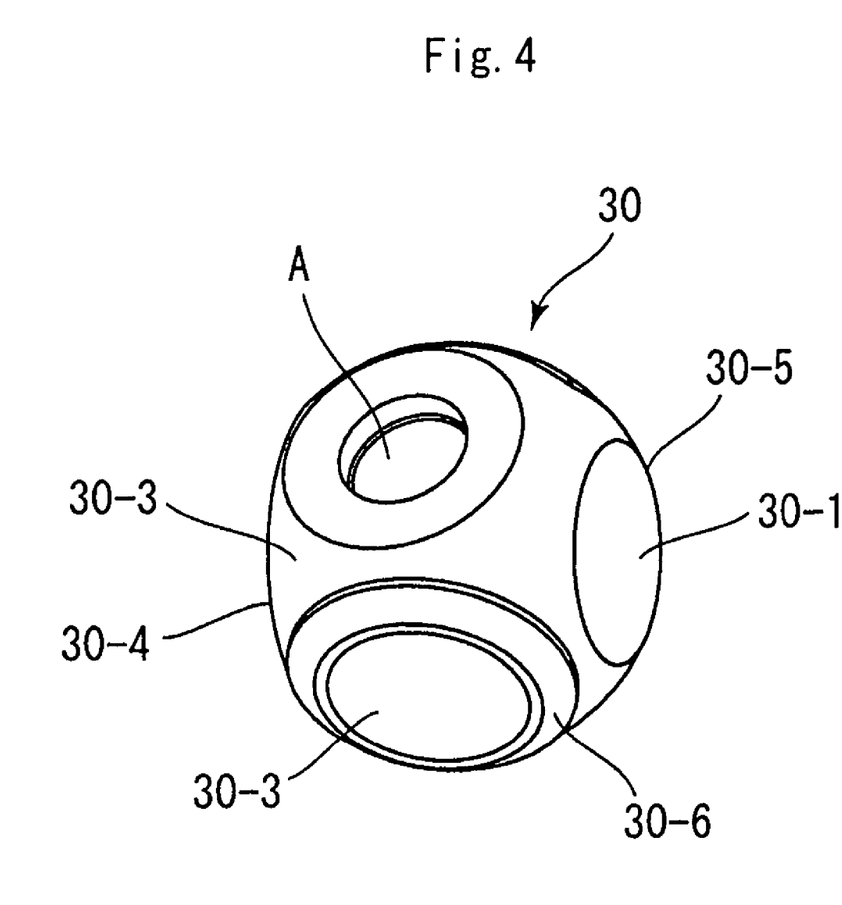
FIG. 4 is an enlarged perspective view of a rotatable valve member according to the present invention.
Figure 5:
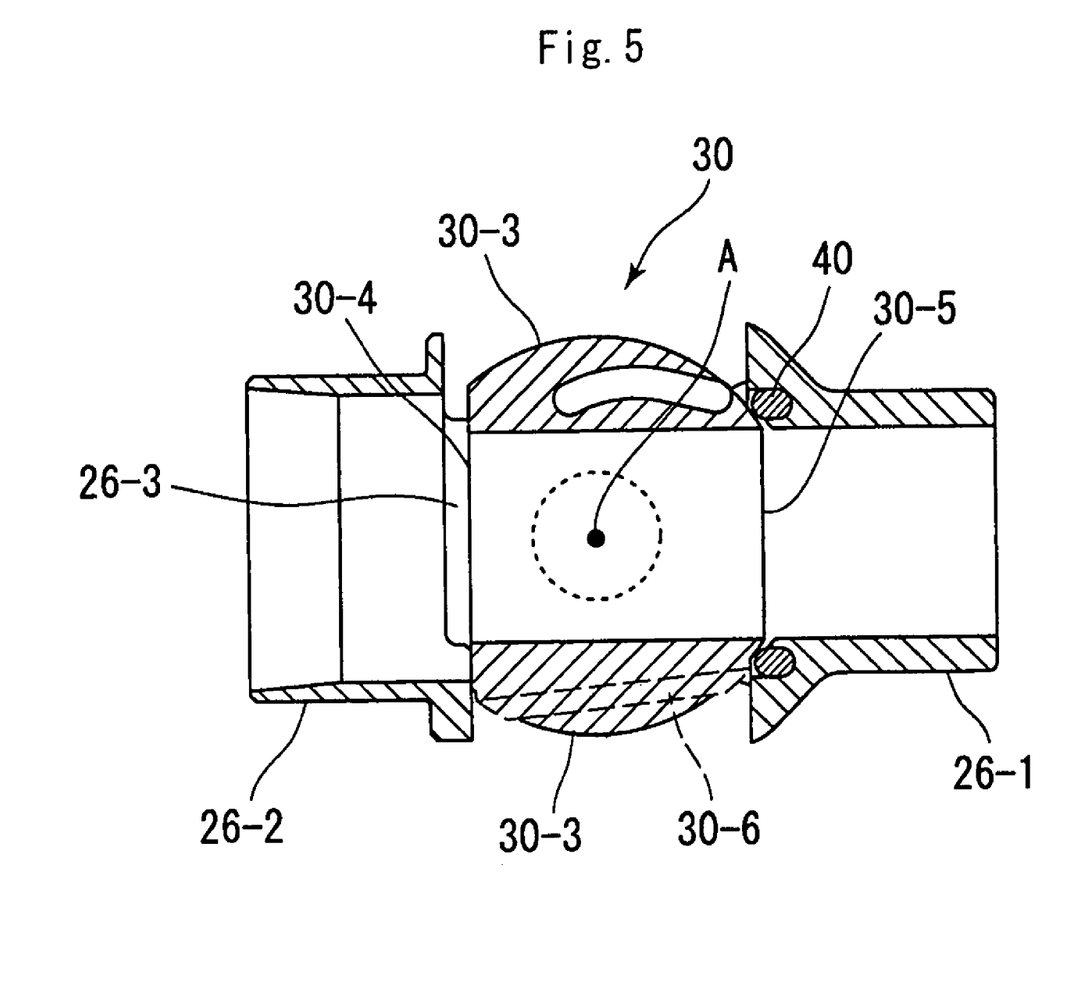
FIG. 5 is a longitudinal sectional view of a valve equipped with the same rotatable valve member, showing a state where the same rotatable valve member is positioned at an opening rotational position.
Figure 6:
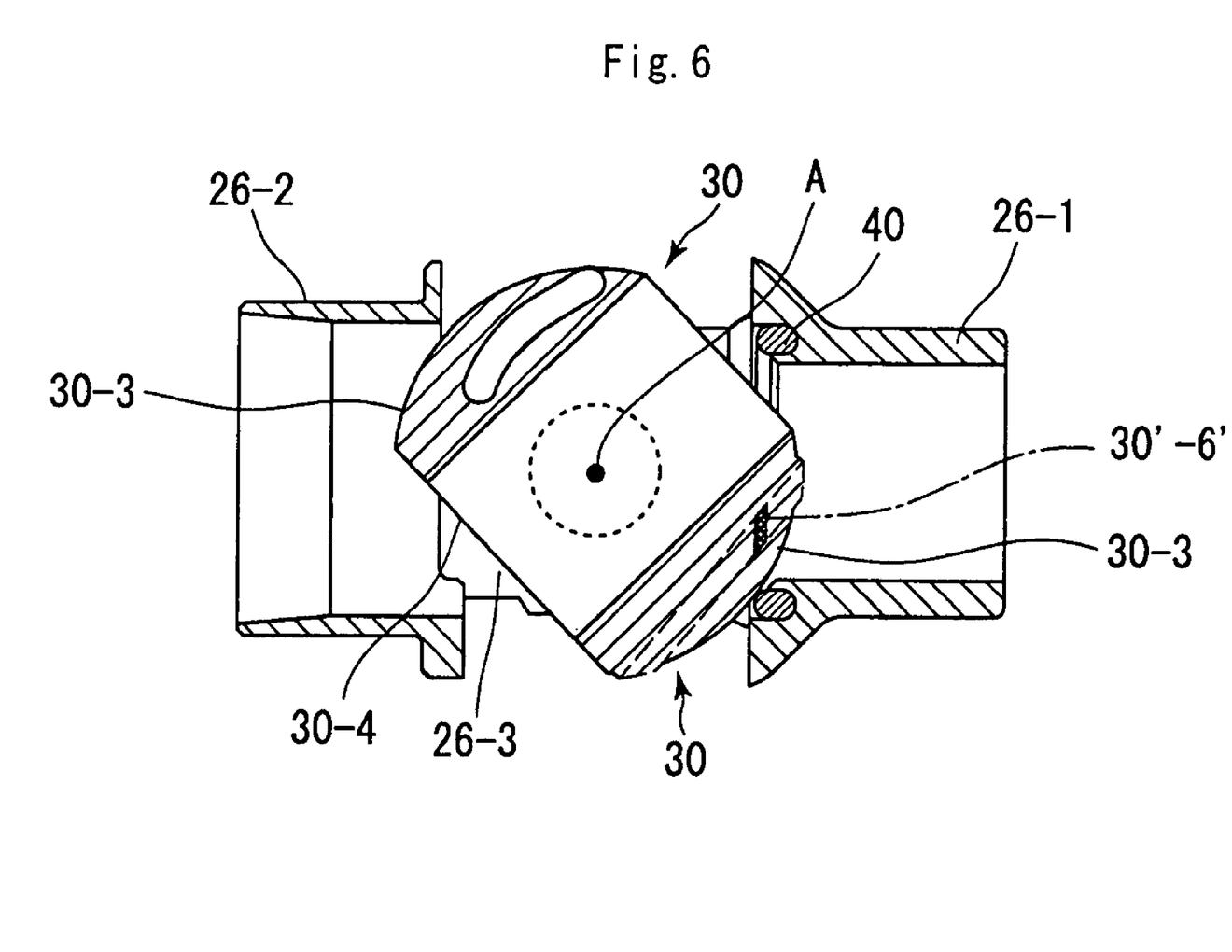
FIG. 6 is a longitudinal sectional view of a valve, showing a state where the same rotatable valve member is in a course of rotational movement from the opening rotational position.
Figure 7:
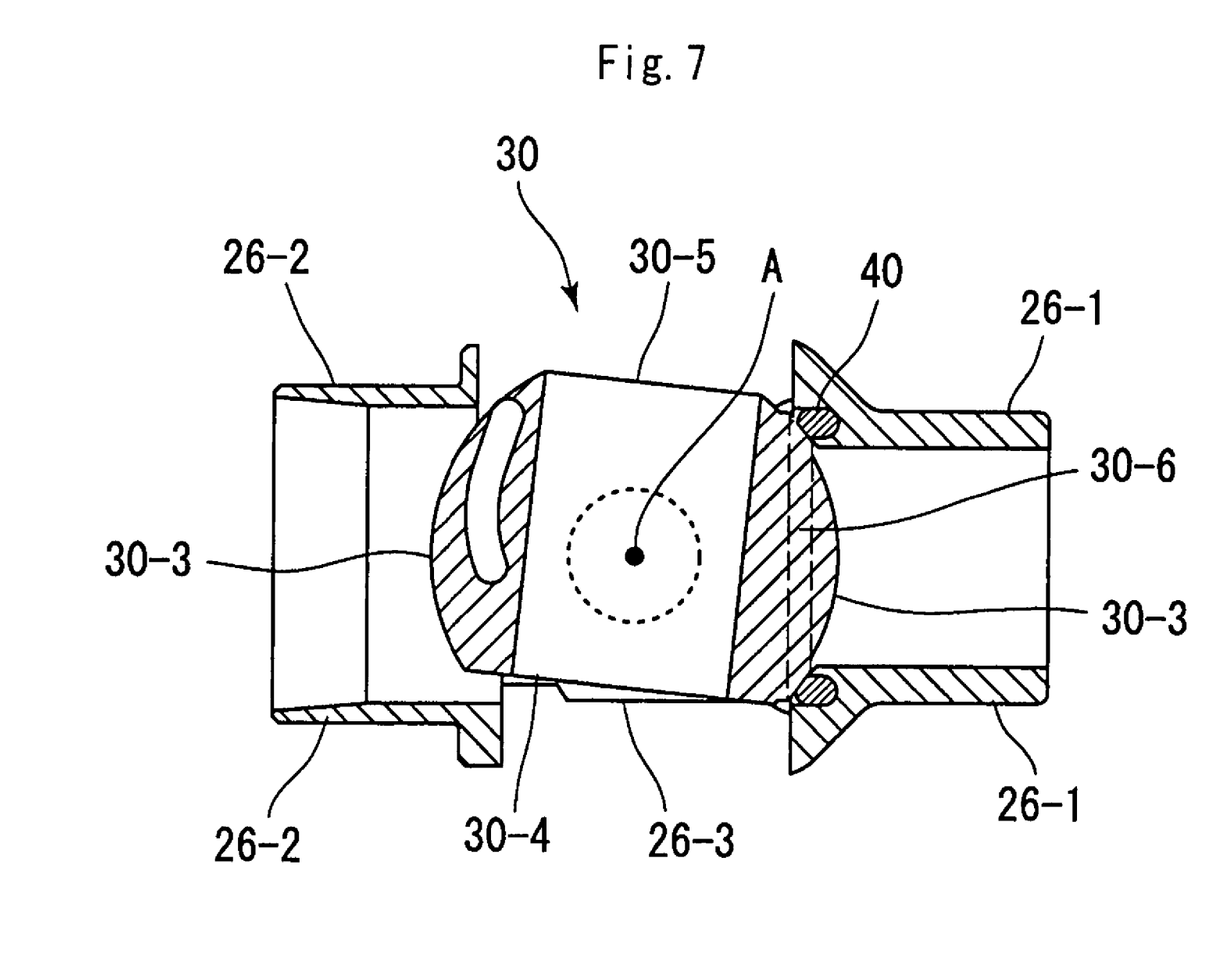
FIG. 7 is a longitudinal sectional view of the valve, showing a state where the same rotatable valve member is positioned at a closing rotational position.

FIG. 4 is an enlarged perspective view of the rotatable valve 30, and FIGS. 5 to 7 show enlarged longitudinal sectional views of the valve 22 including the rotatable valve member.

As can be seen in FIGS. 4 to 7, the spherical outer surface 30-3 of the rotatable valve member 30 is provided with an annular sealing portion 30-6 which protrudes radially outward, as viewed from the pivotal axis $\underline{A}$, from the spherical outer surface 30-3 (i.e., the annular sealing portion 30-6 has larger radii than its surroundings), wherein the annular sealing portion is sealingly engaged with the O-ring 40 mounted at the peripheral edge portion of the rearward end-opening of the forward tubular portion 26-1 so as to prevent fluid flowing through the valve 22. Accordingly, in this rotatable valve member 30, during its rotational movement between the closing rotational position (FIG. 1) and the opening rotational position (FIG. 2), the spherical outer surface 30-3 of the rotatable valve member 30 comes into contact with O-ring 40 only in a part 30-6' of its annular sealing portion 30-6. Stated differently, the annular sealing portion 30-6 is not fully engaged with the O-ring 40 until the rotatable valve member 30 has been positioned in the closing rotational position.

FIGS. 8 to 10 show another embodiment of a rotatable valve member 30.

Differently from the rotatable valve member 30 illustrated in FIGS. 4 to 7 in which the annular sealing portion 30-6 is formed to be integral with the spherical outer surface 30-3, the rotatable valve member 30 illustrated in FIGS. 8 to 10 comprises an annular groove 30-7 formed on the spherical outer surface 30-3 in a location corresponding to the annular sealing portion 30-6, and an O-ring 40-1 securely fitted in the groove 30-7. However, since no O-ring is disposed in the peripheral edge of the rearward end-opening of the forward tubular portion 26-1, when the rotatable valve member 30 is placed in the closing rotational position (FIG. 10), the O-ring 40-1 mounted on the rotatable valve member 30 is sealingly engaged with the peripheral edge of the rearward end-opening of the forward tubular portion. Also, in this embodiment when the rotatable valve member 30 is in a course of rotational movement between the opening rotational position (FIG. 8) and the closing rotational position (FIG. 10), the O-ring 40 comes into contact, exclusively at a part 40-1' with the peripheral edge of the rearward end-opening of the forward tubular portion 26-1.

The male coupling member 14 has a similar configuration to that of the female coupling member 12, and main components of the male coupling member 14 equivalent to those in the female coupling member 12 are designated by the same numerals in FIGS. 1 and 2.

To connect the male coupling member 14 with the female coupling member 12 in the state shown in FIG. 1, an operating sleeve 44 disposed over the outer periphery of the female coupling member 12 is retracted against a force exerted by a spring member 46 to allow a locking ball 48 to be displaced outwardly in a radial direction, and then the forward end portion of the male coupling member 14 is inserted into the forward end portion of the female coupling member 12 to make a connection. During this operation, the valves 22, 22 of the female and the male coupling members are brought into abutment against each other at their forward end surfaces, and are retracted against forces exerted by spring members 28, 28, respectively, and thereby, as described above, the rotatable valve members 30, 30 are moved from their closing rotational positions to opening rotational positions, respectively. At this point, the operating sleeve 44 is returned to its original position so that the locking ball 48 resting within a locking recessed portion 20-2 formed on an outer surface of a tubular body 20 of the male coupling member 14 is able to be pressed from its exterior in a radial direction to be thereby held stationary. To disconnect the female coupling member from the male coupling member, the operating sleeve 44 is retracted against the force exerted by the spring member 46, and the male coupling member is then pulled out of the female coupling member.

It should be noted that the present invention is not necessarily limited to the foregoing embodiment but can be modified in a variety of ways without departing from the gist of the present invention.

What is claimed is:

1. A coupling member of a pipe coupling comprising:
a tubular body having a though hole; and
a valve disposed in said through hole, wherein
said valve comprises:
a valve holder movable in a direction of an axis of said through hole between a closing position and an opening position; and
a rotatable valve member supported by said valve holder;
said valve holder comprises:
a first tubular portion; a rotatable valve member support portion; and a second tubular portion, which are arranged in that order along said axis of said through hole;
said first and second tubular portions have first and second axial through holes respectively;
said rotatable valve member support portion supports said rotatable valve member such that said rotatable valve member is rotatable about a pivotal axis A extending normal to said axis of said through hole so that, when said valve holder is moved between said opening position and said closing position, said rotatable valve member is rotated about said pivotal axis A between an opening rotational position and a closing rotational position, respectively;
said rotatable valve member has a third through hole extending normal to said pivotal axis A which is aligned with said first and second through holes when positioned at said opening rotatable position thereby allowing a fluid to flow through said coupling member;
said rotatable valve member has an outer surface which is formed with an annular sealing portion adapted to be sealingly engaged with an annular portion on an outer surface of said first tubular portion which surrounds an end opening of said first through hole facing said rotatable valve member support portion when said rotatable valve member is positioned at said closing rotational position, whereby said outer surface of said rotatable valve member sealingly blocks said end opening of said first through hole to prevent a fluid from flowing through said coupling member; and
said outer surface of said rotatable valve member has a portion which passes through said annular portion on said outer surface of said first tubular portion when said rotatable valve member rotates between said opening rotational position and said closing rotational position, said portion having smaller radii with relative to said pivotal axis A than said annular sealing portion so as to reduce a friction force generated between said outer surface of said rotatable valve member and said annular portion of said outer surface of said first tubular member when said rotatable valve member rotates between said opening rotational position and said closing rotational position.

2. A coupling member as set forth in claim 1 wherein said annular sealing portion has larger radii relative to said pivotal axis A than surrounding portion of said annular sealing portion of said outer surface.

3. A coupling member as set forth in claim 2 wherein said annular sealing portion is formed to be integral with an exterior surface of said rotatable valve member.

4. A coupling member as set forth in claim 2 wherein said annular sealing portion is formed by an annular sealing member being fittingly secured into an annular groove formed to be annular on said outer surface of said rotatable valve member.

5. A coupling member as set forth in claim 2 wherein:
said rotatable valve member defines a spherical shape as a whole and has a truncated surface portion with respect to the spherical surface; and
said second tubular portion includes a stopper surface which is engaged with said truncated surface portion of said rotatable valve member to stop said rotatable valve member in said opening rotational position when said rotatable valve member is positioned at said opening rotational position.

6. A coupling member as set forth in claim 3 wherein:
said rotatable valve member defines a spherical shape as a whole and has a truncated surface portion with respect to the spherical surface; and
said second tubular portion includes a stopper surface which is engaged with said truncated surface portion of said rotatable valve member to stop said rotatable valve member in said opening rotational position when said rotatable valve member is positioned at said opening rotational position.

7. A coupling member as set forth in claim 4 wherein:
said rotatable valve member defines a spherical shape as a whole and has a truncated surface portion with respect to the spherical surface; and
said second tubular portion includes a stopper surface which is engaged with said truncated surface portion of said rotatable valve member to stop said rotatable valve member in said opening rotational position when said rotatable valve member is positioned at said opening rotational position.

8. A coupling member as set forth in claim 5 wherein said valve holder further comprises a spring member for applying a rotational moment to said rotatable valve member so as to urge said truncated surface portion of said rotatable valve member against said stopper surface when said rotatable valve member is positioned at said opening rotational position.

9. A coupling member as set forth in claim 6 wherein said valve holder further comprises a spring member for applying a rotational moment to said rotatable valve member so as to urge said truncated surface portion of said rotatable valve member against said stopper surface when said rotatable valve member is positioned at said opening rotational position.

10. A coupling member as set forth in claim 7 wherein said valve holder further comprises a spring member for applying a rotational moment to said rotatable valve member so as to urge said truncated surface portion of said rotatable valve member against said stopper surface when said rotatable valve member is positioned at said opening rotational position.

* * * * *